US012717893B2

(12) United States Patent
Wright et al.

(10) Patent No.: US 12,717,893 B2
(45) Date of Patent: Aug. 25, 2026

(54) BLOCKCHAIN IMPLEMENTED COUNTING SYSTEM AND METHOD FOR USE IN SECURE VOTING AND DISTRIBUTION

(71) Applicant: nChain Licensing AG, Zug (CH)

(72) Inventors: Craig Steven Wright, London (GB); Stephane Savanah, London (GB)

(73) Assignee: nChain Licensing AG, Zug (CH)

( * ) Notice: Subject to any disclaimer, the term of this patent is extended or adjusted under 35 U.S.C. 154(b) by 21 days.

(21) Appl. No.: 18/940,646

(22) Filed: Nov. 7, 2024

(65) Prior Publication Data

US 2025/0139228 A1 May 1, 2025

Related U.S. Application Data

(63) Continuation of application No. 18/227,292, filed on Jul. 27, 2023, now Pat. No. 12,271,466, which is a (Continued)

(30) Foreign Application Priority Data

Feb. 23, 2016 (GB) ..................................... 1603112
Feb. 23, 2016 (GB) ..................................... 1603114

(51) Int. Cl.
*G06F 21/52* (2013.01)
*G06F 21/64* (2013.01)
(Continued)

(52) U.S. Cl.
CPC .............. *G06F 21/52* (2013.01); *G06F 21/64* (2013.01); *G06N 7/00* (2013.01); *G06Q 20/065* (2013.01);
(Continued)

(58) Field of Classification Search
CPC .... G06F 21/52; G06F 21/64; G06F 2221/033; G06F 21/72; G06F 12/1408; G06N 7/00;
(Continued)

(56) References Cited

U.S. PATENT DOCUMENTS

2010/0312810 A1* 12/2010 Horton .................... G06F 21/10 707/812
2015/0120567 A1* 4/2015 Van Rooyen ........... G06F 21/00 705/59
(Continued)

OTHER PUBLICATIONS

CN Office Action for corresponding CN Patent Application No. 202210315822.3, issued Sep. 11, 2025, 10 pages.

*Primary Examiner* — J. Brant Murphy
(74) *Attorney, Agent, or Firm* — Christopher Harris

(57) ABSTRACT

An event detecting, monitoring and/or counting mechanism is disclosed. The event may be, for example, a vote, decision or selection which is made by a given entity. A counting solution is provided in which a computing resource, running simultaneously and in parallel to a blockchain, manages a loop-based operation. The computing resource continuously monitors the state of the blockchain as well as any other off-blockchain input data or source. The execution of the loop is influenced by the state of the blockchain. Each iteration of the loop that is executed by the computing resource is recorded in a transaction that is written to the blockchain. It is stored as a hash within the transaction's metadata. If the computing resource finds a transaction which contains a hash relating to the loop it accesses the relevant portion of code.

20 Claims, 5 Drawing Sheets

| Field | Subfield | Bytes | Value | Description |
|---|---|---|---|---|
| Metadata-OutputHash | OutputHash | 20 | | RIPEMD-160 (SHA256(the output metadata file addressed by OutputPointer)). |
| | Padding | 12 | 0x00000... | Spare bytes. |
| Metadata-OutputPointer | OutputPointer | 16 | | IPv6 address of the metadata relating to the output of the code. |
| | Padding | 16 | 0x00000... | Spare bytes. |

Related U.S. Application Data continuation of application No. 17/219,674, filed on Mar. 31, 2021, now Pat. No. 11,755,718, which is a continuation of application No. 16/079,093, filed as application No. PCT/IB2017/050820 on Feb. 14, 2017, now Pat. No. 11,347,838.

(51) Int. Cl.

| | |
|---|---|
| ***G06N 7/00*** | (2023.01) |
| ***G06Q 20/06*** | (2012.01) |
| ***G06Q 20/38*** | (2012.01) |
| ***H04L 9/00*** | (2022.01) |
| ***H04L 9/06*** | (2006.01) |
| ***H04L 9/08*** | (2006.01) |
| ***H04L 9/32*** | (2006.01) |

(52) U.S. Cl.

CPC ....... *G06Q 20/3827* (2013.01); *G06Q 20/389* (2013.01); *H04L 9/00* (2013.01); *H04L 9/0637* (2013.01); *H04L 9/0643* (2013.01); *H04L 9/0825* (2013.01); *H04L 9/3213* (2013.01); *H04L 9/3236* (2013.01); *G06F 2221/033* (2013.01); *G06Q 2220/00* (2013.01); *H04L 9/50* (2022.05); *H04L 2209/463* (2013.01); *H04L 2209/56* (2013.01)

(58) Field of Classification Search

CPC ............. G06Q 20/065; G06Q 20/3827; G06Q 20/389; G06Q 2220/00; H04L 9/00; H04L 9/0637; H04L 9/0643; H04L 9/0825; H04L 9/3213; H04L 9/3236; H04L 9/50; H04L 2209/463; H04L 2209/56; H04L 9/3239

See application file for complete search history.

(56) References Cited

U.S. PATENT DOCUMENTS

| | | | | |
|---|---|---|---|---|
| 2015/0120569 | A1* | 4/2015 | Belshe | G06Q 20/3829 705/71 |
| 2015/0206106 | A1* | 7/2015 | Yago | G06Q 20/0655 705/68 |
| 2015/0213433 | A1* | 7/2015 | Khan | G06Q 20/3829 705/71 |
| 2015/0244690 | A1* | 8/2015 | Mossbarger | H04L 9/50 713/171 |
| 2015/0324764 | A1* | 11/2015 | Van Rooyen | G06Q 20/02 705/69 |
| 2015/0363773 | A1* | 12/2015 | Ronca | G06Q 40/02 705/71 |
| 2016/0027229 | A1* | 1/2016 | Spanos | H04L 9/3239 705/51 |
| 2016/0261690 | A1* | 9/2016 | Ford | G06F 21/645 |
| 2017/0132620 | A1* | 5/2017 | Miller | H04L 9/0637 |
| 2018/0096360 | A1* | 4/2018 | Christidis | H04L 9/0643 |
| 2018/0285840 | A1* | 10/2018 | Hasan | G06Q 10/40 |
| 2019/0034936 | A1* | 1/2019 | Nolan | G06Q 20/42 |
| 2019/0080404 | A1* | 3/2019 | Molinari | G06Q 40/04 |
| 2019/0080406 | A1* | 3/2019 | Molinari | G06Q 40/02 |
| 2019/0130368 | A1* | 5/2019 | Li | G06Q 20/4016 |
| 2019/0188793 | A1* | 6/2019 | Molinari | G06Q 40/02 |
| 2019/0266132 | A1* | 8/2019 | Rubenstein | G06F 16/182 |
| 2020/0264676 | A1* | 8/2020 | Gauthier, Jr. | H04N 23/80 |

* cited by examiner

Each cell represents a block or a transaction.
Letters A to G represents metadata.

```
i = 0
repeat {
# If Condition Then Action
        i = i + 1;
} until (i = J)

Get cryptographic hash (H1) of the code above
```

```
# If Condition Then Action    code block example

IF trigger_detected [1] THEN
        Perform Action [2]
        Increment index and update control data [3]
END-IF
```

[1] the *"trigger"* may be a particular state of the blockchain, or an event detected off-block (e.g. a date or temperature reading, etc.) or a combination of both

[2] *Action* may include sending a signal to cause an event off clock, or broadcasting a new transaction, or a combination of both

[3] The index may be maintained (i) off block within the Manager or may be (ii) a value stored within a transaction that is then broadcast.
(i) and (ii) represent two alternative ways to maintain the control data

Fig. 3

| Word | Opcode | Hex | Input | Output | Description |
|---|---|---|---|---|---|
| OP_TOALSTACK | 107 | 0x6b | x1 | (alt)x1 | Puts the input onto the top of the alt stack. Removes it from the main stack. |
| OP_FROMALSTACK | 108 | 0x6c | (alt)x1 | x1 | Puts the input onto the top of the main stack. Removes it from the alt stack. |

Fig. 4

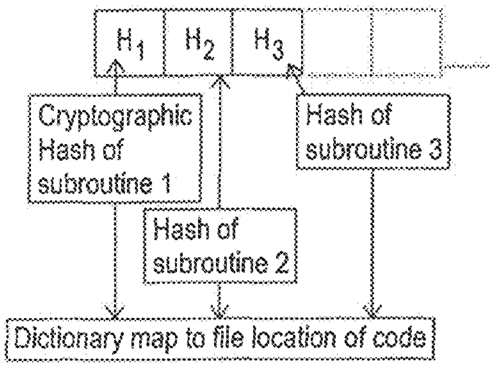

Fig. 5

| Field | Subfield | Bytes | Value | Description |
|---|---|---|---|---|
| Metadata-CodeHash | CodeHash | 20 | | RIPEMD-160 (SHA256(the actual code file addressed by CodePointer)). |
| | Index | 12 | | Integer index / denoting which iteration of the loop is at. |
| Metadata-CodPointer | CodeType | 4 | 0x00000001 | Indicates it is a Manager code that perfoms loops. |
| | CodePointer | 16 | | IPv6 address of the actual code file location. |
| | Padding | 12 | 0x00000... | Spare bytes. |

Fig. 6

| Field | Subfield | Bytes | Value | Description |
|---|---|---|---|---|
| Metadata-OutputHash | OutputHash | 20 | | RIPEMD-160 (SHA256(the output metadata file addressed by OutputPointer)). |
| | Padding | 12 | 0x00000... | Spare bytes. |
| Metadata-OutputPointer | OutputPointer | 16 | | IPv6 address of the metadata relating to the output of the code. |
| | Padding | 16 | 0x00000... | Spare bytes. |

Fig. 7

| |
|---|
| Redeem Script: 4 Metadata-OldCodeHash Metadata-NewCodeHash Metadata-OldCodePointer Metadata-NewCodePointer PK-User PK-OS PK-Developer PK-Vendor 8 OP-CHECKMULTSIG |
| Locking Script: OP_HASH160 < 20-byte hash of redeem script > OP_EQUAL |
| Unlocking Script: Sig-User Sig-OS Sig-Developer Sig-Vendor Redeem Script |

*Legend:*

*Hash: Hash of the code block*
*Metadata: Metadata associated with the transaction*
*OS: Operating System*
*PK: Public Key*
*Sig: Signature*

Fig. 8

| |
|---|
| Redeem Script: 4 Metadata-OldCodeHash Metadata-NewCodeHash Metadata-OldCodePointer Metadata-NewCodePointer PK-User PK-OS PK-Developer PK-Vendor 8 OP-CHECKMULTSIG |
| Locking Script: OP_HASH160 < 20-byte hash of redeem script > OP_EQUAL |
| Unlocking Script: Sig-User Sig-OS Sig-Developer Sig-Vendor Redeem Script |

*Legend:*

*Hash: Hash of the code block*
*Metadata: Metadata associated with the transaction*
*OS: Operating System*
*PK: Public Key*
*Sig: Signature*

Fig. 9

```
# Voting Counting Bot Example Repeat Loop
# The conditions of the vote
We have 100 people and if we have 57 yes votes by 1st January 2016, we
will release payments to Jason.

# Part1. Run the send vote tokens bot
i.   Generate 100 Bitcoin public keys and fill each with a small amount of
     Bitcoins.
ii.  Each address represents an authorised token which must be used to
     cast a vote.
iii. Securely send the token and the corresponding private key to each
     person entitled to vote.
iv.  The bot will keep the list public key associated with each authorized
     token, and make this list public before the vote.
v.   To ensure voting cannot be rigged, destroy the list of private keys.
vi.  To ensure voting is anonymous, destroy any association of token
     with voter's identity to anonymise them.

# Part2. Run the vote count bot
Array_of_tokens = [list of 100 authorized tokens];
Yes_count = 0;
repeat {
        this_token = pop from Array_of_tokens;
        if ( signature received from this_token and
            current date < 1st January 2016 )
                Increment Yes_count;
        }
} until (Array_of_tokens is empty)

if ( Yes_count > = 57 ) {
                Pay to Jason's Account.
}
```

Fig. 10

BLOCKCHAIN IMPLEMENTED COUNTING SYSTEM AND METHOD FOR USE IN SECURE VOTING AND DISTRIBUTION

CROSS-REFERENCE TO RELATED APPLICATIONS

This application is a continuation of U.S. patent application Ser. No. 18/227,292, filed Jul. 27, 2023, entitled "BLOCKCHAIN IMPLEMENTED COUNTING SYSTEM AND METHOD FOR USE IN SECURE VOTING AND DISTRIBUTION," which is a continuation of U.S. patent application Ser. No. 17/219,674, filed Mar. 31, 2021, now U.S. Pat. No. 11,755,718, entitled "BLOCKCHAIN IMPLEMENTED COUNTING SYSTEM AND METHOD FOR USE IN SECURE VOTING AND DISTRIBUTION," which is a continuation of U.S. patent application Ser. No. 16/079,093, filed Aug. 22, 2018, now U.S. Pat. No. 11,347,838, entitled "BLOCKCHAIN IMPLEMENTED COUNTING SYSTEM AND METHOD FOR USE IN SECURE VOTING AND DISTRIBUTION," which is a 371 National Stage of International Patent Application No PCT/IB2017/050820, filed Feb. 14, 2017, entitled "BLOCKCHAIN IMPLEMENTED COUNTING SYSTEM AND METHOD FOR USE IN SECURE VOTING AND DISTRIBUTION," which claims priority to United Kingdom Patent Application No. GB 1603112.2, filed Feb. 23, 2016, and United Kingdom Patent Application No. GB 1603114.8, filed Feb. 23, 2016, the disclosures of which are incorporated herein by reference in their entirety.

TECHNICAL FIELD

This invention relates generally to blockchain implementations and technologies. The invention is particularly suited, but not limited to, use with the Bitcoin Blockchain and for applications such as device/system control, process control, distributed computing and storage. In particular, the invention relates to a technical solution for managing a voting, counting, selection and/or decision making process. The invention is not limited to use in political voting applications or scenarios.

BACKGROUND

In this document we use the term 'blockchain' to include all forms of consensus-based electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction-if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. These include but are not limited to:

- Storing metadata
- Implementing digital tokens
- Establishing contracts that are signed with digital signatures.

It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing, cryptographic security features etc.) while being more versatile in their applications.

One area of current interest within the blockchain community is Turing Completeness, and specifically how to facilitate Turing Complete behaviour into blockchain technologies, which have been designed to restrict functionality for security reasons.

It is disputed whether Bitcoin scripting language is Turing complete because it does not natively support complex flow control functionality, for example, loops to occur. One advantage of this restriction is that the programs have predictable execution times. Another significant advantage of limiting the Bitcoin scripts to linear or tree-like decision tasks is that this avoids infinite loops, which can be used as a means of launching exploits such as a denial of service (DOS or DDoS) attack. As a result of this limitation, Bitcoin scripts are often limited to being used for linear tasks rather than more complex applications such as the control of automated tasks, device management, etc.

The Ethereum blockchain platform approaches this issue by incorporating a "built in" Turing complete language called Solidity. This language is native to the Ethereum platform so that scripts written in Solidity can include control flow mechanisms such as loops. However, Ethereum has suffered from several attacks and exploits.

There also remains a desire within a significant portion of the blockchain community to preserve the use of these limited scripting languages in relation to blockchain technologies due to the security concerns mentioned above, and because of the widespread use and familiarity of the Script language used by Bitcoin.

Thus, it is desirable to provide a solution which facilitates Turing-complete functionality such as looping mechanisms and other complex control structures to be integrated or combined with blockchain scripts, while avoiding the damaging effects of potential security weaknesses such as infinite loops. Such a solution would provide numerous benefits including:

Enabling the automation of complex blockchain-related transactions;

Controlling the metadata stream that is recorded onto the Blockchain; and

Extending the functionality and applications of blockchain platforms which do not rely on or incorporate purposefully Turing complete languages.

Such an improved solution has now been devised. The present invention provides a solution which comprises the novel combination of a blockchain coupled with a parallel computing resource which enables the emulation, simulation and/or incorporation of loops and other Turing-complete functionality outside the typical blockchain script. In turn, this facilitates numerous applications for automated tasks relating to, for example, distributed data storage, distributed computing and the control of drones, or any IoT (Internet of Things) devices. Such applications may include using the blockchain for metadata storage, managing digital tokens and establishing contracts. Another useful application is the automation of a vote or selection-counting process.

The following provide background material to the technical field of the present invention: US2016/027229 A; WO2016/022864 A and U.S. Pat. No. 6,061,449 A. The following on-line resources, also available at the time of filing, provide technical background:

https://nxt.org/what-is-nxt/voting/ http://bitcoin-development.narkive.com/uRciVtAQ/standard-bip-draft-turing-pseudocompleteness https://news.ycombinator.com/item?id=7287155 https://news.ycombinator.com/item?id=11372455 http://cryptonomics.org/2014/02/01/ethereum-turing-complete.

SUMMARY

Thus, in accordance with the present invention there is provided a solution as defined in the appended claims. In accordance with the invention there may be provided a (process) control method and corresponding system. The invention may be referred to as a blockchain-implemented control method/system. It may control an automated task or process.

The invention may be arranged to use a blockchain to emulate/simulate Turing completeness. Additionally or alternatively, the invention may enable applications which involve Turing complete control mechanisms to be executed on a blockchain platform.

Additionally or alternatively, the invention may be described as a method or system arranged to use a blockchain and/or one or more blockchain transactions to control a process executing on an off-block computing resource. Thus, the invention comprises an arrangement wherein distinct computing components, which are functionally and architectural different from each other, are arranged to interact so as to provide a novel technical result. The interaction of the different computing systems (computing resource and blockchain) results in a highly powerful control solution.

From the perspective of the computing resource, the invention provides the advantage of a permanent, tamper-proof record of the execution of the program. From the blockchain perspective, the invention provides an improved blockchain implementation because it enables Turing-complete behaviour to be at least partially simulated via use of the blockchain, which in turn enables more functionally complex blockchain-based applications to be deployed. This is all achieved while maintaining the use of the limited scripting language for the blockchain transactions. The scripting language may be limited (restricted) in that its design or implementation prevents or at least does not natively support the incorporation of complex control flow mechanisms such as loops into code written in that language. The instructions set of the language i.e., the “commands” or “op-codes” that the programmer can use, may be arranged such that it does not include commands for complex flow control mechanisms.

The blockchain may be associated with, or used with, a blockchain protocol which comprises a limited language. This may be a scripting language. The invention may extend the functionality of a limited scripting language for the execution of tasks using the blockchain.

The invention may use the state of the blockchain to execute a loop-based process. The loop-based process may be performed on a computing resource operating in parallel to the blockchain network. The computing resource may be distinct from (not part of) the blockchain network. The computing resource may be referred to as an “oracle” or a “bot.”

This enables the blockchain protocol to utilise a functionally limited scripting language while allowing control flow mechanisms such as looping mechanisms to be implemented off the blockchain. This novel combination enhances the versatility of blockchain technology while preserving security.

In accordance with one or more embodiments of the invention there may be provided a computer-implemented event handling, monitoring, detecting and/or counting process and corresponding system. Embodiments of the invention may be arranged to respond to events which are generated by an entity. The invention may monitor/detect and/or count votes, selections or decision or other types of events. For the sake of convenience herein, the terms “vote” or “decision” may be used to refer to the event which is monitored, counted, recorded and/or detected etc. by the invention.

One or more embodiments of the invention may be described as a control method and corresponding system. It may be described as a blockchain implemented method/system. The invention may be arranged to control a process. The process may be an industrial or non-industrial process. The event e.g., decision may be made by a machine, electronic/software-based entity, natural person(s), legal entity or other. One or more embodiments of the invention may comprise a method/system for counting, monitoring, recording, detecting and/or otherwise handling events. The events may be decisions or selections e.g., votes made by entities within an application area. It is not restricted to counting politically-oriented votes or events in a political context, although it could be used for this purpose. It may be used, for example, to record how many times a machine makes a certain selection, or how many times a cell mutates etc. The decision may be a binary or non-binary decision. It may count or record how many times an event occurs/does not occur.

The method may comprise the steps:

distributing or allocating at least one token to at least one predetermined entity, wherein the at least one token is represented by a cryptographic public key and private key pair; and executing a loop on a computing resource to maintain a count of one or more events (e.g., votes, selections, actions or decisions) generated by the at least one entity.

The invention may provide a computer-implemented vote or decision counting process, comprising the steps:

distributing or allocating at least one token to at least one predetermined entity, wherein the at least one token is represented by a public key and private key pair; and executing a loop on a computing resource to maintain a count of one or more votes or decisions made by the at least one entity.

The cryptographic key pair may be referred to as a "blockchain public and private key pair." It may be arranged for use with a blockchain platform, and for secure transfer of value between blockchain transaction inputs and outputs, as is known in the art. A key may function as a blockchain address.

The invention may provide a computer-implemented vote or decision counting method comprising the steps:

distributing or allocating at least one token to at least one predetermined entity, wherein the at least one token is represented by a blockchain public key and private key pair; and executing a loop on a computing resource, the loop being implemented using a script, to maintain a count of one or more votes or decisions generated by or associated with the at least one entity; and generating a cryptographic hash of the script.

The invention may provide a computer-implemented vote or decision counting method comprising the steps:

distributing or allocating at least one token to at least one predetermined entity, wherein the at least one token is represented by a blockchain public key and private key pair; and executing a loop on a computing resource to maintain a count of one or more votes or decisions made by the at least one entity, wherein information relating to at least one iteration of the loop is stored in a transaction on the blockchain.

The invention may provide a computer-implemented vote or decision counting method comprising the steps:

distributing or allocating at least one token to at least one predetermined entity, wherein the at least one token is represented by a blockchain public key and private key pair;

executing a loop on a computing resource to maintain a count of one or more votes or decisions made by the at least one entity;

generating a cryptographic hash of code relating to the loop; and preferably comprising the step of storing the cryptographic hash within a transaction on the blockchain.

The invention may provide a computer-implemented vote or decision counting method comprising the steps:

distributing or allocating at least one token to at least one predetermined entity, wherein the at least one token is represented by a blockchain public key and private key pair; and executing a loop on a computing resource to maintain a count of one or more votes or decisions made by the at least one entity, wherein the computing resource is arranged to monitor the state of the blockchain for a transaction comprising a cryptographic hash of code relating to the loop.

The at least one predetermined/preselected entity may be a machine, electronic/software-based entity. In other embodiments, the entity may be a natural person(s), legal entity or other. The blockchain may be the Bitcoin Blockchain or some other blockchain platform. Distribution may be performed by broadcasting to the blockchain network. There may be a plurality of entities (e.g., voters or decision makers). At least one token may be distributed and/or allocated to each of the respective entities within the plurality.

The count of one or more votes or decisions may be stored in the blockchain (e.g., in a transaction) and/or the alternate stack of the blockchain.

The method may comprise the step of implementing the loop using a script. The script may be written in a scripting language. It may be based on the Forth scripting language. The language may be non-Turing complete. It may be a stack-based language. The scripting language may be limited (restricted) in that its design or implementation prevents or at least does not natively support the incorporation of complex control flow mechanisms such as loops into code written in that language. The instructions set of the language i.e., the "commands" or "op-codes" that the programmer can use, may be arranged such that it does not include commands for complex flow control mechanisms.

The method may further comprise the step of generating a cryptographic hash of the script or a portion thereof.

The method may further comprise the step of using a secret exchange protocol to distribute and/or allocate the at least one token to the at least one entity.

The method may further comprise the step of loading each public key and address with an item representative of one or more choices, preferably wherein the item is an amount of currency. The currency may be Bitcoin-related.

The method may further comprise the step of maintaining, on or in association with the computing resource, a list of public keys associated with each authorized entity and/or token. The method may further comprise the step of destroying (and/or never storing) the list of private keys and a mapping/association between the identity of the entity and their allocated token.

The method may further comprise the step of maintaining a list of addresses. The list may be an empty list or comprise one or more addresses. At least one address may be associated with the least one entity. Preferably, at least part of the list is specified, represented or defined in a blockchain script.

The method may further comprise the step of transferring the list of addresses to the (blockchain) alternate stack for storage; preferably wherein an address is removed from the alternate stack once a vote for that address (or other condition) has been counted, detected and/or otherwise handled.

The method may further comprise the step of executing the loop until the list of addresses becomes empty.

The method may comprise the steps of:

executing the loop on a computing resource (e.g., server or plurality of servers); and using the state of the blockchain to influence the execution of the loop; and/or influencing the state of the blockchain as a result of executing the loop.

The computing resource may be any processor-based device or system. It may, for example, be a server or plurality of servers. It may be a standalone or a distributed resource. The blockchain may be the Bitcoin blockchain or any other blockchain-related platform. The blockchain may be a consensus-based electronic ledger.

Information relating to at least one iteration of the loop may be stored in a transaction on the blockchain. The information may be stored as metadata in the transaction. The loop may contain a "If condition then action" (ICTA) instruction.

The method may further comprise the step of generating a cryptographic hash of code relating to the loop and, preferably, storing the cryptographic hash within a transaction on the blockchain. The code may be a code block containing a control flow statement, such as an "If condition then action" statement.

The computing resource may be arranged to monitor the state of the blockchain for a transaction comprising a cryptographic hash of code relating to the loop.

The method may further comprise the steps:

for each iteration of the loop:

evaluating a condition and performing at least one action based on the outcome of the evaluation, wherein the at least one action comprises:

causing at least one transaction to be written to the blockchain; and/or causing an off-blockchain action to be performed.

The condition may be used to monitor any value, signal or input, regardless of where, how or by whom it is generated, either on or off the blockchain. The condition may relate to data received, detected or generated by the computing resource; and/or the state of the blockchain. The condition may be described as a "trigger". It may be or relate to a particular state of the blockchain, or an event detected off-block (e.g., a date or temperature reading, etc.), or a combination of both.

The Action may include sending a signal to cause an event off clock, or broadcasting a new transaction, or a combination of both. The index may be maintained (i) off block within the Manager or may be (ii) a value stored within a transaction that is then broadcast. (i) and (ii) represent two alternative ways to maintain the control data.

The computing resource may be arranged to monitor:

the state of the block chain; a value generated or received by the computing resource; and/or a data or signal source provided off the blockchain.

The method may comprise the steps of:

i) using the blockchain as a storage component for data, instructions or a pointer to data and/or instructions; and ii) using a computing resource as a control flow management component for a Turing complete process, the computing resource being arranged to execute a looping mechanism.

Thus, the blockchain may serve as the non-erasable tape of a Turing machine. The computing resource may serve to control the flow of execution of the process, implementing a loop and extending the functionality of the scripting language.

The method may further comprise the step of restarting (respawning) the loop at a specified iteration. The loop may be restarted if the computing resource finds a predetermined hash of a portion of code in a transaction within the blockchain. The portion of code may relate to the body of the loop. It may comprise an ICTA statement.

The computing resource may respawn the loop at each iteration. This may be performed in a variety of ways. For example, a code block for the loop may be:

hard-coded into the computing resource itself;

stored in a private or publicly available file;

stored as an entry on a private or public hash table file; or a combination of the above.

The code block may be static with hard-coded variables or may be static but contain parameter(s) that can be populated. The parameters may be single values of any data format, or could be small chunks of code, or combinations of the above. The parameters may be populated by retrieving them directly from metadata in a transaction (e.g., bitcoin transaction) or from an external source such as an internal database or a private/public file or hash table or any combination of the above. Pointers to the external source of parameter values may be stored in metadata in a transaction.

The information relating to the iteration may be specified using metadata provided within, or in association with, the transaction.

The computing resource may comprise or be in communication with a registry which enables the computing resource to access a pre-stored version of the subroutine. The registry may alternatively be described as a database, repository or other form of storage facility. The registry may store:

i) a cryptographic hash of code relating to the loop; and ii) information indicative of a location where a copy of the code can be accessed from.

The method may further comprise the step of using a blockchain transaction to update code for the loop so that the existing code is replaced with new code. Preferably, the transaction is a multi-signature P2SH transaction. A hash of the existing code and a hash of the new code may be stored.

The invention also provides a system for implementing any embodiment of the method described above.

The invention may provide a computer-based system. It may be described as a computer-implemented event counting, monitoring, detecting and/or handling system. The event may be a vote, decision, selection or any other type of event. It may be arranged to simulate or emulate Turing completeness. The system may comprise:

a blockchain; and a computing resource arranged to execute a loop such that execution of the loop is influenced by state of the blockchain.

Information relating to at least one iteration of the loop is stored in a transaction on the blockchain. Preferably, the information is stored as metadata in the transaction.

Preferably, the computing resource is arranged to generate a cryptographic hash of code relating to the loop. Preferably, the cryptographic hash is stored within a transaction on the blockchain. Additionally or alternatively, the computing resource is arranged to monitor the state of the blockchain for a transaction comprising a cryptographic hash of code relating to the loop.

Preferably, for each iteration of the loop: a condition is evaluated and at least one action is performed based on the outcome of the evaluation; the at least one action comprising:

causing at least one transaction to be written to the blockchain; and/or causing an off-blockchain action to be performed.

The condition may relate to data received, detected or generated by the computing resource; or the state of the blockchain.

The computing resource may be arranged to monitor:

the state of the block chain;

a value generated or received by the computing resource; and/or a data or signal source provided off the blockchain.

The blockchain may serve as a storage component for data, instructions or a pointer to data and/or instructions. The computing resource may serve as a control flow management component for a Turing complete process, the computing resource being arranged to execute a looping mechanism.

The loop may be restarted at a specified iteration if the computing resource finds a predetermined hash of a portion of code in a transaction within the blockchain. The information relating to the iteration may be specified using metadata provided within, or in association with, the transaction.

The computing resource may comprise or be in communication with a storage facility which may be referred to as a registry, database or repository, and which enables the computing resource to access a pre-stored version of the subroutine. The registry may store:

i) a cryptographic hash of code relating to the loop; and ii) information indicative of a location where a copy of the code can be accessed from.

The system may be configured to use a blockchain transaction to update code for the loop so that the existing code is replaced with new code. Preferably, the transaction is a multi-signature P2SH transaction. Preferably, the system is arranged to store a hash of the existing code and a hash of the new code.

Any feature described in relation to one aspect or embodiment of the invention may also be applicable in respect of any other aspect or embodiment. For example, any feature described in relation to the method may also be used in relation to the system, and vice versa.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which:

FIG. 3 shows an example of a ICTA (If Condition Then Action) code block which can be used in accordance with an embodiment of the invention.

FIG. 4 shows the bitcoin commands that allow users to move data in and out of the alternative stack, in accordance with an embodiment of the invention.

FIG. 5 shows the Manager's code registry in accordance with an embodiment of the invention.

FIG. 6 shows metadata associated with the Manager's code block, in accordance with an embodiment of the invention.

FIG. 7 shows metadata associated with the output at a particular iteration of the Manager's loop, in accordance with an embodiment of the invention.

FIG. 8 shows a transaction script and metadata, in accordance with an embodiment of the invention.

FIG. 9 shows an illustrative Manager software patching verification and audit trail.

FIG. 10 shows an illustrative use of the present invention, and shows an embodiment of a vote counting bot's repeat loop in pseudocode.

DETAILED DESCRIPTION

Figures 1, 2:
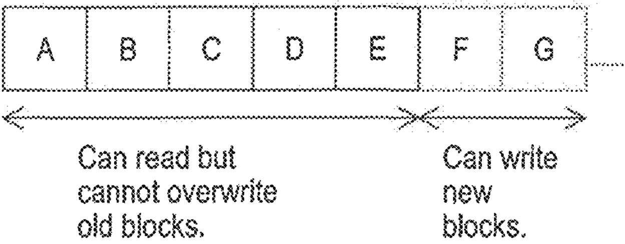
FIG. 1 shows an illustrative use of the Blockchain as a non-erasable tape for the Turing machine.
FIG. 2 illustrates a subroutine that can be used by the Manager to implement a repeat loop in conjunction with a blockchain.

The following describes an illustrative embodiment which uses the Bitcoin Blockchain. However, other blockchain protocols and implementations may be used. The invention is not limited in this regard.

The present invention addresses the problem of how to facilitate Turing Completeness on an operationally limited blockchain platform (i.e., one which uses a scripting language that does not support complex control mechanisms), and therefore extend the uses or applications to which the blockchain can be put. Marvin Minsky (Minksy, et al., *Computation: Finite and Infinite Machines*, Prentice Hall, Inc., 1967) described how a non-erasable tape can be used to implement a machine that is Turing complete, and is able to execute any algorithm that can also be executed on a Universal Turing machine.

The present invention comprises a computing resource which operates in conjunction with the blockchain, using it as the non-erasable tape in the implementation of a Turing machine. This computing resource runs in parallel with the blockchain network, overseeing and handling the execution of a looping process. The looping process is designed to perform a given task such as, for example, the automation of a process or control of a device or system. This parallel resource monitors the state of the blockchain and can cause transactions to be written to the blockchain. Therefore, it may be referred to herein as "the Manager" for convenience of reference.

Features and advantages of the invention include:

Enabling the Blockchain to serve as a non-erasable tape of the Turing Machine

The function and implementation of a computer-based monitoring and management component (Manager) which operates alongside the Blockchain Using the Manager as the instruction table of the Turing Machine Managing the Manager using a code registry Transaction metadata relating to the Manager's code and respawning of the loop Using digital signatures to implement software updates to the Manager A special implementation of the Manager using an alternate Blockchain.

The Blockchain as the Turing Machine's Non-Erasable Tape

With reference to FIG. 1, the present invention utilises the Blockchain as a non-erasable tape of the Turing Machine, with the following definitions and features:

1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the Manager is to act as an agent that monitors the current state of the Blockchain. It can also receive a signal or input from any off-block source. Depending on the Blockchain state and/or a received input, the Manager may perform certain actions. The manager decides which action(s) are to be performed. These may or may not involve actions in the 'real world' (i.e., off block) and/or actions on the Blockchain (such as creating and broadcasting new transactions). The action that the Manager takes may be triggered by the Blockchain state. The Manager may also decide on the next set of transactions to be broadcast to the Bitcoin network, and subsequently written to the Blockchain.

The Manager's action(s) run in parallel and simultaneously to the Bitcoin network. In a sense, this extends the function of the behaviourly-restricted Bitcoin script. This continuous monitoring implements the 'loop' control-flow constructs making the combined Manager and Blockchain system Turing Complete.

The Manager as the Turing Machine's Instruction Table

In accordance with an embodiment of the invention, the Turing Machine includes two stacks:

- Data stack: This is represented by the Blockchain as described above.
- Control stack: This is represented by the Manager function. This stores information relating to the repeat control-flow function.

The separation of the control stack from the data stack provides the advantage of preventing infinite loops from occurring within the Bitcoin core. This in turn mitigates denial-of-service attacks on the Bitcoin system.

The Manager manages and runs subroutines that are able to loop via any type of loop construct (e.g., FOR-NEXT; REPEAT UNTIL; etc.). An illustrative embodiment described herein includes a process using one example of the 'repeat' construct (see FIG. 2). The user specifies the index (i) and the limit (J). These represent the current iteration number (typically counted starting from 0) and the total number of iterations of the repeat loop respectively.

For Each Iteration:

1. The Index increments by 1. For the exit condition, the iterations will stop when the index reaches the limit;
2. A code block containing an "if condition then action" (ICTA) statement is executed; the action may be any action on or off the blockchain;
3. A cryptographic hash of this subroutine is computed. This can be stored in the Blockchain as part of a transaction. Since the hash is unique to each code, it will enable verification of which code has been used.

The body of the loop includes a code block. Each code block contains a "If condition then action" (ICTA) statement (see FIG. 3). This monitors the current state of the Blockchain for transactions matching the:

- Start or triggering condition (e.g. when a particular Bitcoin address reaches 10 BTC).
- Repeat condition (i.e., a metadata or hash associated with the previous iteration).
- Stop condition (i.e., last iteration of the loop).

The ICTA statement enables the Manager to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash_AnyoneCanPay' in one of the transaction inputs. This permits anyone to contribute to the inputs of the transaction. This parameter enables the Manager's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g., C, C++, Java) and not limited to information stored on the Blockchain. Some example conditions are listed below:

- Monitor the date and time (i.e., when a certain date and time are reached).
- Monitor the weather (i.e., when the temperature is below 10° C. and it is raining).
- Monitor social media (i.e., when I've received a message from my friend).
- Monitor conditions of a contract or a trust (i.e., when company A buys company B).
- Monitor news and events (i.e., when soccer team A wins a match).
- Monitor information from the internet of things (i.e., when a light bulb needs replacing).
- Monitor data from a mobile/wearable device (i.e., when a wearable step tracking device counts 10000 steps).
- Monitor results from cloud computing (i.e., when a computation is completed and results are received).
- Monitor remote data storage (i.e., if file still exists remotely).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form specified by the Manager. However, in accordance with one embodiment of the invention, the metadata may store a hyperlink to a file containing more data or instructions relating to the action. The metadata may store both a hyperlink to a hash table containing more data or instructions relating to the action along with a hash of the action that acts as the loop-up key for the hash table. An embodiment may use a link similar in style to the BitTorrent's magnet URL format.

A list of example actions is listed below.

- Bitcoin transactions (i.e., send Bitcoins to a particular address).
- Social media (i.e., send a message to a friend).
- Trading (i.e., sell X shares).
- Internet of things (i.e., switch off a light bulb).
- Commerce (i.e., purchase an item online).
- Online services (i.e., pay a monthly fee or pay for services requested using Bitcoin).

As the invention is not limited in respect of the nature, type or number of actions performed, it provides a highly versatile solution which may be applied to great advantage over a wide range of applications.

The Manager's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'alt stack.'

The op codes are:

OP_TOALTSTACK—which moves data from the top of the main stack onto the top of the alt stack.

OP_FROMALTSTACK—which moves data from the top of the alt stack to the top of the main stack (See FIG. 4).

This enables data from intermediate steps of calculations to be stored in the alt stack, similar to the 'memory' function which allows data to be stored on the calculator. In accordance with an illustrative embodiment of the invention, the alt stack is used for configuring bitcoin scripts to solve small computation tasks and returning the results in the computation.

Using a Code Register to Manage the Manager

The Manager also manages a registry of all the codes that it owns and runs. This registry is structured like a lookup table or dictionary that maps a specific key to a specific value (see FIG. 5). The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly.

The implementation of the code registry can vary. For example, the lookup table can be implemented using a locally managed list, or a P2P distributed hash table. The source code can be stored locally, remotely, or using a decentralized file storage system. This could be implemented with a magnet URI format or any link format that uses shared zero knowledge encryption.

Transaction Metadata of the Manager's Code, and Re-Spawning of the Loop

Information required to respawn the Manager's loop at a particular iteration is stored as metadata in the transaction recorded on the Blockchain (see FIG. 6 and FIG. 7).

In this way, a transaction on the blockchain stores or provides access to information about a given iteration of the loop which is being executed on the Manager. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. See FIG. 8 for the script's format. The metadata recorded with the transaction also gives the ability to record an audit trail of how the code has been executed in the past.

There are several ways in which the Manager could respawn the repeat loop code block at each iteration. The code block might be hard-coded into the Manager itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g., bitcoin transaction) or from an external source such as an internal database or a private/public file or hash table or any combination of the above. Pointers to the external source of parameter values might be stored in metadata in a transaction.

The following steps provide one example of how the Manager can respawn a repeat loop code block at the ith iteration. In this example, the code registry is a hash table whereby the hash values act as look-up keys for the table and are stored in metadata on transactions.

1. The Manager monitors the Blockchain for transactions that contain hashes of the code block that matches entries in the code registry.
2. The Manager finds a transaction that contains the corresponding hash ($H_1$).
3. The Manager reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The Manager reads the 'Metadata-CodeHash' which stores the index I, and respawns the code at the $i^{th}$ iteration. In other words, the loop is 'reloaded' at the appropriate iteration.
5. The signature of the User is included in the P2SH command to verify the origin of the metadata.
6. The Manager reads the 'Metadata-OutputHash' and 'Metadata-OutputPointer' (see FIG. 6) to retrieve the output of the previous steps, if these data are required for this iteration of the loop.

Multiple signatures may be required to unlock the transaction (e.g. the User, the Operating System, the Software Developer and the Software Vendor). This enables a digital rights management (DRM) system for managing the rights to operate the codes by all parties involved in the P2SH transaction.

Updating the Manager's Code

Software updates and patches for code blocks that relate to the Manager are securely authorized using a multi-signature P2SH transaction (see FIG. 8). The multi-signature transaction records metadata of the old and new code blocks as shown in FIG. 5. This makes a record of the changeover of the old code to the new code, thereby providing an audit trail of the software update. The Manager needs to store all hashes of the old and new blocks of source codes. The hash of the new and old source code blocks can be used to verify the integrity of the code files.

In accordance with an embodiment of the invention, multiple signatures are required to unlock the transaction (e.g., the User, the Operating System, the Software Developer and the Software Vendor). This provides a DRM system for managing software updates and patches for codes that are used by the Manager.

Unlike most software, which does not allow software to be updated while it is running, an advantage of the present invention is that software updates can occur in the middle of executing a loop. This provides a dynamic and responsive solution which can be reconfigured in real-time and with minimal disruption to the process which is being controlled by the invention.

The information captured on the Blockchain (see FIG. 8 and FIG. 9) can be used to update to the new code in the middle of a loop, and start the next iteration step using the output metadata from the previous iteration from the old code.

The Vote Counting Invention

The current Bitcoin scripting language does not allow loops to take place. This prevents using Bitcoin payments from triggering continuous and automated actions unless there is external intervention. However, as the Manager continuously monitors information on the Blockchain, this allows automated actions to be performed based on up-to-date information on the Blockchain.

The following illustrates how the Manager's control stack can be used to automate processes involving an automated and online vote counting bot.

The vote counting bot of the present invention is designed to facilitate fair and pseudo-anonymous voting, with the Blockchain recording a secure and immutable audit trail of the vote counting process. The vote counting bot is automated using the Manager's control stack and repeat loop (see FIG. 10). The following scenario illustrates how an embodiment of this may operate.

Let us assume that there are 100 voters. If 57 unique "Yes" votes are received before 1$^{st}$ January 2016, payments will be released to the Chair, Jason. The voting process is divided into two parts:

Token distribution

Counting.

For the token distribution, 100 voting tokens are distributed, one to each authorized voter. Each token is represented by a (e.g.) Bitcoin public key and private key pair. This is distributed to each voter using a secret exchange protocol. Key exchange protocols are known in the art. Each Bitcoin public key and address is loaded (associated) with a small amount of Bitcoin representing one vote. The bot keeps the list of public keys associated with each authorized token and makes this list public before voting begins. To ensure voting cannot be rigged and that voting is anonymised, the list of private keys and the mapping between the voter's identity and their token is destroyed (i.e., never stored).

Having an anonymized and pre-authorized list of addresses provides other important benefits. It ensures that only those who are authorized can cast a valid vote. It can also facilitate the exclusion of any unwanted votes that originate from particular addresses (e.g., spammers, disqualified voters) without compromising the identity of the voters. To implement the counting process, the Manager runs a repeat loop. The list of addresses are be kept in the bitcoin script, and transferred to the alternate stack for storage of data. Once an address has been counted, it is removed from the alternate stack and no longer added to the next transaction. The repeat loop stops when the list of addresses becomes empty.

Instead of using the integer index i to keep track of where the loop is currently at, the vote bot Manager uses it to store the intermediate value of the vote count. This ensures that the intermediate value of vote count is stored in the Blockchain. This provides an audit trail, and shows that the vote counting process is fair.

If the amount of unique "Yes" votes received reaches 57, the agreed amount of Bitcoins will be paid to Jason's account. The cryptographic hash of the vote counting script, and the IPv6 address of where this script is stored, are released to the public. This means that the public has enough information to perform a recount, and ensure the vote counting process is fair and correct.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer implemented method performed by a computing resource in parallel with a blockchain-related platform, the method comprising the steps:

distributing or allocating voting tokens to a plurality of authorized voters, wherein one voting token represents one vote and wherein each voting token is represented by a blockchain public key and private key pair;

the computing resource monitoring a state of a blockchain network for one or more vote counting transactions relating to a vote by one or more of a plurality of authorized users;

executing, by the computing resource, a looping process to perform vote counting comprising managing and running a loop, the loop having an index (i) representing a current vote count and a limit (J) indicating a total number of iterations of the loop.

2. The method according to claim 1, wherein an iteration of the loop comprises steps of:

a. incrementing the current vote count (i) by 1;

b. executing a code block of the loop containing an "if condition then action" (ICTA) statement; and c. computing a cryptographic hash of steps (a) and (b), storing the cryptographic hash in a blockchain transaction and broadcasting the blockchain transaction to the blockchain network to record the execution of the iteration of the loop; and repeating the steps (a), (b), and (c) until the limit (J) is reached.

3. The method according to claim 2, wherein the computing resource is arranged to monitor the state of the blockchain network for a transaction comprising the cryptographic hash of code relating to the loop.

4. The method according to claim 1, the method further comprising, for each iteration of the loop:

evaluating a condition and performing at least one action based on an outcome of the evaluation, wherein the at least one action comprises causing an off-blockchain action to be performed.

5. The method according to claim 1, further comprising the step:

using a secret exchange protocol to distribute or allocate at least one token of the voting tokens to a at least one entity.

6. The method according to claim 1, further comprising loading each public key and address with an item representative of one or more choices or possible courses of action, wherein the item is an amount of currency.

7. The method according to claim 1, further comprising the step:

maintaining, on or in association with the computing resource, a list of public keys associated with each authorized entity and/or token.

8. The method according to claim 7, further comprising the step:

destroying or never storing a list of private keys and a mapping between an identity of an entity and their allocated token.

9. The method according to claim 1, further comprising the step:

maintaining a list of addresses, wherein at least one address is associated with least one entity, wherein the list is represented or defined in a blockchain script.

10. The method according to claim 9, further comprising the step:

transferring the list of addresses to an alternate stack for storage, wherein an address is removed from the alternate stack once a vote for that address has been counted.

11. The method according to claim 10, further comprising the step:

executing the loop until the list of addresses becomes empty.

12. The method according to claim 1, wherein code for the loop is:

hard-coded into or on the computing resource; and/or stored in a private or publicly available file; and/or stored as an entry on a private or public hash table file; and/or a static code block with hard-coded variables or at least one parameter.

13. The method according to claim 1, wherein code for the loop is associated with or comprises at least one parameter that is:

populated, initialized, or instantiated with a single value of any data format;

a portion of code;

retrieved from metadata in a blockchain transaction or from a source external to the computing resource;

retrieved from a database, or a private or public file, or hash table; and/or populated using values that are accessed using at least one pointer to a data source, wherein the at least one pointer is stored as metadata in a transaction on the blockchain.

14. The method according to claim 1, wherein the computing resource comprises or is in communication with a registry which enables the computing resource to access a pre-stored version of the steps (a) to (c), wherein the registry stores:

a cryptographic hash of code relating to the loop; and information indicative of a location where a copy of the code can be accessed from.

15. A computer-based system comprising:

a blockchain network; and a computing resource arranged to run in parallel with the blockchain network and oversee handling and execution of a looping process, the system arranged to carry out a method of:

distributing or allocating voting tokens to a plurality of authorized voters, wherein one voting token represents one vote and wherein each voting token is represented by a blockchain public key and private key pair;

the computing resource monitoring a state of a blockchain network for one or more vote counting transactions relating to a vote by one or more of a plurality of authorized users;

executing, by the computing resource, a looping process to perform vote counting comprising managing and running a loop, the loop having an index (i) representing a current vote count and a limit (J) indicating a total number of iterations of the loop.

16. The system of claim 15, wherein an iteration of the loop comprises steps of:

a. incrementing the current vote count (i) by 1;

b. executing a code block of the loop containing an "if condition then action" (ICTA) statement; and c. computing a cryptographic hash of steps (a) and (b), storing the cryptographic hash in a blockchain transaction and broadcasting the blockchain transaction to the blockchain network to record the execution of the iteration of the loop, and repeating the steps (a), (b), and (c) until the limit (J) is reached.

17. The system according to claim 16, wherein the computing resource comprises or is in communication with a registry that enables the computing resource to access a pre-stored version of a subroutine, and wherein the registry stores:

the cryptographic hash of code relating to the loop; and information indicative of a location where a copy of the code can be accessed from.

18. The system according to claim 15, wherein code for the loop is:

hard-coded into or on the computing resource; and/or stored in a private or publicly available file; and/or stored as an entry on a private or public hash table file; and/or a static code block with hard-coded variables or at least one parameter.

19. The system according to claim 15, wherein code for the loop is associated with or comprises at least one parameter that is:

populated, initialized, or instantiated with a single value of any data format;

a portion of code;

retrieved from metadata in a blockchain transaction or from a source external to the computing resource;

retrieved from a database, or a private or public file, or hash table; and/or populated using values that are accessed using at least one pointer to a data source, wherein the at least one pointer is stored as metadata in a transaction on the blockchain.

20. The system according to claim 15, wherein the computing resource comprises or is in communication with a registry which enables the computing resource to access a pre-stored version of the steps (a) to (c), wherein the registry stores:

a cryptographic hash of code relating to the loop; and information indicative of a location where a copy of the code can be accessed from.

* * * * *